United States Patent [19]
Becker

[11] Patent Number: 5,937,411
[45] Date of Patent: Aug. 10, 1999

[54] METHOD AND APPARATUS FOR CREATING STORAGE FOR JAVA ARCHIVE MANIFEST FILE

[75] Inventor: Craig Henry Becker, Austin, Tex.

[73] Assignee: International Business Machines Corporation, Armonk, N.Y.

[21] Appl. No.: 08/976,267

[22] Filed: Nov. 21, 1997

[51] Int. Cl.$^6$ .................................................. G06F 17/30
[52] U.S. Cl. ............................................ 707/103; 707/100
[58] Field of Search ................... 707/1, 5, 10, 100–104, 707/200–206; 711/150, 206, 216; 395/701, 705, 707, 709, 710, 712

[56] References Cited

U.S. PATENT DOCUMENTS

| | | | |
|---|---|---|---|
| 5,438,659 | 8/1995 | Notess et al. | 345/335 |
| 5,577,241 | 11/1996 | Spencer | 707/5 |
| 5,689,711 | 11/1997 | Bardasz et al. | 395/701 |
| 5,742,806 | 4/1998 | Reiner et al. | 707/3 |
| 5,787,280 | 7/1998 | Joseph et al. | 707/203 |
| 5,787,431 | 7/1998 | Shaughnessy | 707/100 |
| 5,802,373 | 9/1998 | Yates et al. | 395/705 |
| 5,842,017 | 11/1998 | Hookway et al. | 395/707 |
| 5,862,386 | 1/1999 | Joseph et al. | 395/712 |

*Primary Examiner*—Ruay Lian Ho
*Attorney, Agent, or Firm*—David A. Mims

[57] ABSTRACT

A method and apparatus for creating an object-oriented storage structure for storing parsed data so that it can be accessed and manipulated. A Java Archive (JAR) file containing a Manifest file is parsed and the contents placed in the object-oriented storage structure. The Manifest file contains a plurality of paragraphs where each paragraph is separated by a blank line. Each paragraph in the Manifest file is associated with an element in a Paragraph Vector in the object-oriented storage structure. Each element of the Paragraph Vector contains a reference to a Hashtable where each element in the Hashtable corresponds to a Manifest <key>:<value> pair. The storage structure is capable of dynamically growing to the necessary size of the JAR file. Paragraphs are easily added to the end of each Paragraph Vector while maintaining the ordering of the Paragraph Vectors and the performance of look-up searches.

15 Claims, 5 Drawing Sheets

METHOD AND APPARATUS FOR CREATING STORAGE FOR JAVA ARCHIVE MANIFEST FILE

FIELD OF THE INVENTION

The present invention relates to data processing systems, and more particularly, to an object-oriented approach for storing, retrieving and manipulating information for a Java Archive (JAR) Manifest file.

BACKGROUND OF THE INVENTION

Java is both a programming environment and a language produced by Sun Microsystems Inc. Java embraces the vision of networked computing and communications where an application may be stored on one system, yet downloaded and run on an entirely different one. Devices can download pieces of programs from different locations to run on one processor. Different processors can run a single application, passing data among each other across a network.

Java accomplishes platform independence through an intermediate computing state. Java's source is compiled into a byte code. The byte code is machine-independent, which means that interpretation must take place before the byte code runs on the native instruction set of the target processor. The interpretation is done through a Java Virtual Machine (JVM), a software layer that forms a bridge between the byte code and actual hardware. The JVM takes system calls and interprets them into corresponding machine instruction. Java allows developers to use the most productive development environment available, irrespective of platform. There is no need to develop on the same platform as the target platform or worry about cross-compiling because a Java program will run on any processor have a JVM.

Java also offers advantages during programming. Memory management is far simpler, and program bugs are fewer, because Java doesn't use pointers but utilizes references. A reference is an abstract identifier for an object. A reference tags a particular object with a name in the Java Virtual Machine so that the developer may refer to it. At the level of machine code in a CPU, a reference is an address in memory where the address of the object is stored. In this way, the objects can be moved around in memory and only the master pointer needs to be updated rather than all references to the object. This is completely hidden from the Java developer. All memory is dynamically allocated, as a variable is instantiated, but access to individual memory addresses violates the Java security model and is not permitted. Java reclaims memory through automated garbage collection. As memory is allocated, it's referenced by a variable or structure in the language. The garbage collector searches for unreferenced memory which it reclaims and adds to the free memory list, releasing developers from memory management worries.

Java developers typically make a linked list in Java using the Vector Class in java.util. Some developers assert that Java's Vector Class can do anything a linked list can do, and a little more, and saves coding.

Java is a pure object-oriented language. Every variable is an object in the class hierarchy and has a set of predefined methods, or functions, that can be used to operate it. The object model lets developers define data structures corresponding to real-life objects, making the translation between what a program has to do and how it's implemented transparent.

The advantages of Java to developers is speed of development and code maintainability. Much development involves modifying code from existing class libraries, rather then creating new structures. The object-oriented approach encourages a natural program structure, making it highly readable and easy to modify. For details and background with respect to the Java System, reference may be made to a typical text, "Just Java", 2nd Edition, Peter van der Linden, Sun Microsystems, 1997.

Java employs a platform independent file format that concatenates and compresses many Java classes, image, audio and other information into one file called a JAR (Java ARchive) file. One of the main attributes of the JAR file design is to reduce the number of HTTP (HyperText Transfer Protocol) connections that need to be opened, thus reducing download times. The file format is the popular ZIP format and can be used as a general archiving tool. The JAR archive file contains a Manifest file located at META-INF/MANIFEST.MF within the archive. This file contains information about the structure of other files within the JAR file. Applications that work with JAR files need to access the structure information contained in the Manifest file. In JavaSoft's Bean Development Kit (manufactured by JavaSoft, a division of Sun Microsystems, Inc.), the Manifest file is parsed and the data is placed in a Vector of structures called "MessageHeaders", where each MessageHeader has a couple of arrays. One array is used to hold the a key and the other holds a value. A linear search is then used to look-up values. One problem with this technique is that the performance of the search decreases as more data pairs are added. Another problem is that the technique is complex and difficult to understand.

Consequently, it would be desirable to provide a method and apparatus for creating a simple object-oriented storage structure that enables parsed data from a Manifest file to be quickly accessed and manipulated.

SUMMARY OF THE INVENTION

This invention relates to a method and apparatus for creating an object-oriented storage structure for storing parsed data so that it can be accessed and manipulated. A Java Archive (JAR) file containing a Manifest file is parsed and the contents are placed in the object-oriented storage structure. The Manifest file contains a plurality of paragraphs where each paragraph is separated by a blank line. Each paragraph in the Manifest file is associated with an element in a Paragraph Vector in the object-oriented storage structure. Each element of the Paragraph Vector contains a reference to a Hashtable where each element in the Hashtable corresponds to a Manifest <key>:<value> pair. The storage structure is capable of dynamically growing to the necessary size of the JAR file and paragraphs are easily added to the end of each Paragraph Vector while maintaining the ordering of the Paragraph Vectors.

DETAILED DESCRIPTION OF THE EMBODIMENTS

This invention provides a method and apparatus for creating a memory structure for storing and retrieving information about an object-oriented object. In the preferred embodiment, the object-oriented object is a Java Bean stored in a Java Archive (JAR) file. As used in this invention, a Java Bean, or just Bean, consists of one or more files, each containing compiled Java code or data, that is associated with the Java Bean. A Bean is a software component which can be visually manipulated in development environments. The JAR file contains a Manifest file located at META-INF/MANIFEST.MF within the archive. This file contains information about the structure of other files within the JAR file. Applications that work with the JAR file need to access the structure information contained in the Manifest.

Figure 1:
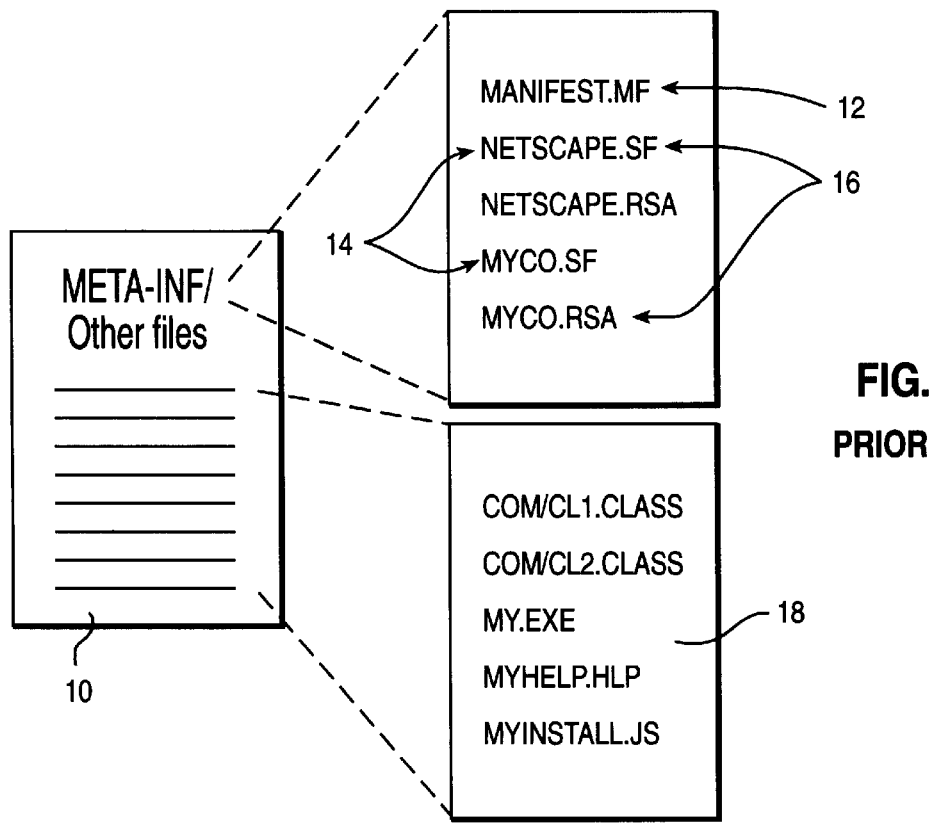
FIG. 1 illustrates a prior art Java Archive (JAR) file.

Referring to FIG. 1, there is shown a block diagram of a prior art JAR (Java Archive) file. Java Beans are typically distributed and installed in a development environment by packaging them in the JAR file. These files are essentially ZIP files that are created using a JAR utility. Referring again to FIG. 1, a JAR file has a subdirectory 10 of meta-information that is always named META-INF. The subdirectory 10 contains a single Manifest file 12 that is always named MANIFEST.MF. The MANIFEST.MF file contains arbitrary information about the files in the archive, such as their encoding or language. The JAR file is also capable of containing zero or more signature files named name.SF 14. There is one of these files for each entry that has signed files in the archive. In addition, the JAR file may contain zero or more digital signature files named name.suf 16, where the suffix (e.g., RSA) is determined by the digital signature format. There is at least one of these files for each signature instruction file. In addition to the MANIFEST.MF subdirectory, the archive contains whatever files 18 a user wishes to package in the archive, such as files to be installed for an automatic software installation feature.

Figure 2:
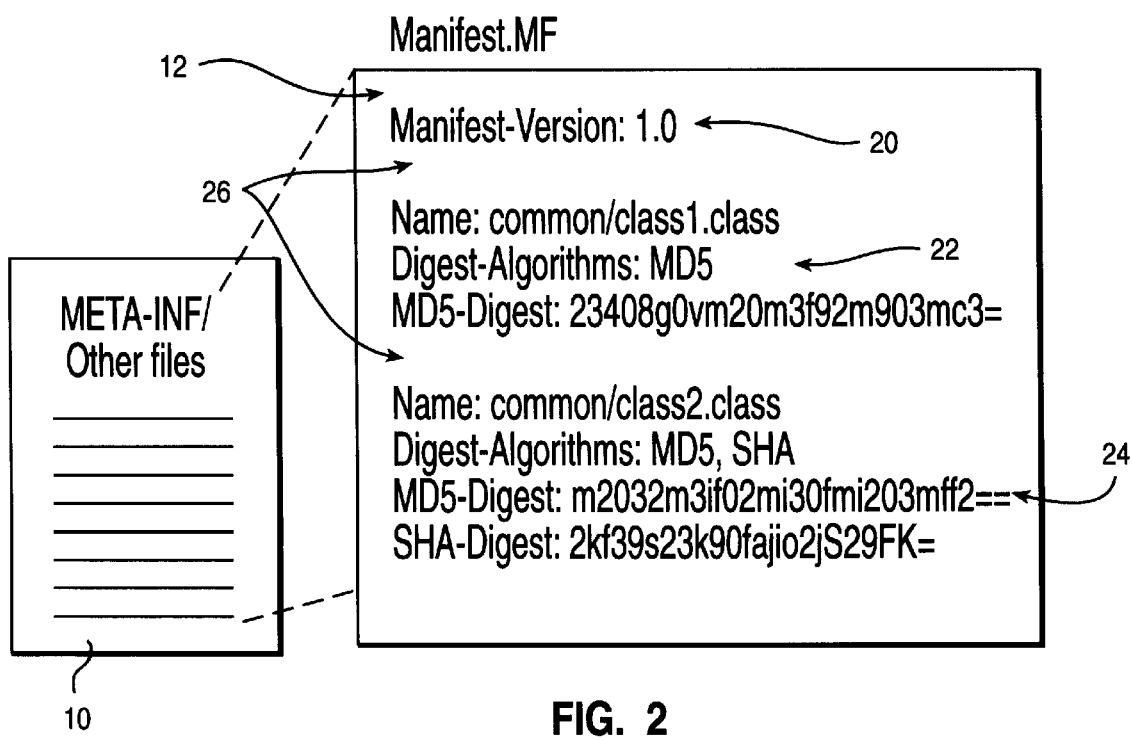
FIG. 2 illustrates the contents of a prior art Java Manifest file.

Referring to FIG. 2, there is shown a JAR file with a standard subdirectory 10 of meta-information named META-INF, with a Manifest file 12 named MANIFEST.MF. The Manifest file 12 contains information composed into three paragraphs 20–24. Each of the paragraphs 20–24 are separated by a blank line 26 indicating the end of the paragraph. Applications that work with JAR files need to access the information contained in the Manifest file 12. The Manifest file 12 is parsed and the data is presented as a <key>:<value> pair, one pair per line, with pair grouped into blank-line-separated paragraphs. The parsed data is placed into a data structure to allow the data to be accessed and manipulated. JavaSoft's Bean Development Kit (BDK) utilizes a Vector of structures called "MessageHeaders", where each MessageHeader has a couple of arrays, one to hold the key, and the other to hold the value. A simple linear search is then used to look up the values. The operation of this prior art data structure becomes slower as the number of data pairs are increased. In addition, the prior art structure is difficult to code and understand.

Figure 3:
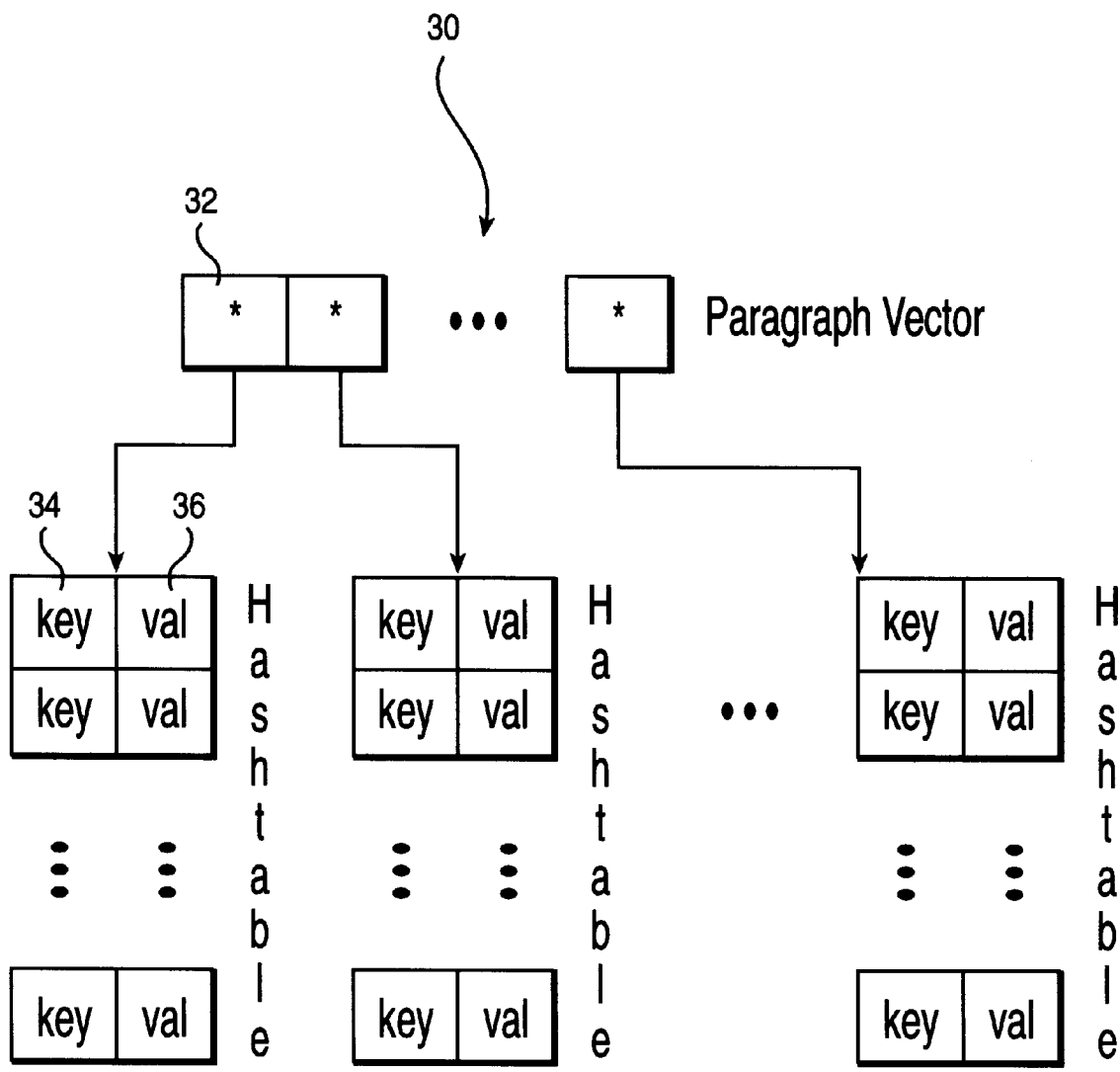
FIG. 3 is a diagram of a storage structure for storing parsed data from a Manifest file using this invention.

Referring to FIG. 3, there is shown a block diagram of this invention for a simple, fast, highly functional data structure 30 for storing the parsed data from a Manifest file 12 (FIG. 2). The data structure 30 of this invention allows the data to be easily accessed and manipulated (e.g., paragraphs and data pairs can be added, changed or deleted). The data structure 30 contains an element in the Paragraph Vector 32 for each of the paragraphs 22–24 (FIG. 2) in the Manifest file 12. A Paragraph Vector 32 is used instead of a Hashtable because paragraphs do not typically have an "id" associated with them. All that is necessary is for the paragraphs be in a list as shown in the Manifest file 12 of FIG. 2. A Paragraph Vector was chosen over an array because vectors have the feature of dynamically growing themselves to the necessary size of the JAR file, thus enabling the addition of new paragraphs to the end of each vector while maintaining their order. Returning to FIG. 3, each element of the Paragraph Vector 32 contains a reference to a hashtable element corresponding to a set of Manifest <key> 34:<value> 36 pairs. One skilled in the art will appreciate that the data structure of this invention is compact and flexible and can utilize Java Development Kit's (manufactured by Sun Microsystems Inc.) java.util.Vector and java.util.Hashtable Classes. It will also be appreciated that the use of Hashtables allow for O(1) look-up times which allows the invention to provide fast look-up, which does not increase as more data pairs are added.

In addition, this invention is easily extendible to cover other alternatives for searching, accessing and manipulating Java Bean JAR Manifest files. For example, in cases where it is necessary or desirable to access manifest paragraphs by the Name:key of a data pair contained within a paragraph, the Paragraph Vector can be replaced with a Paragraph Hashtable. Each Paragraph Hashtable element has a key (for example, the aforementioned Name: value) and a value, the value being a reference to the affiliated Hashtable that contains the data pairs for that paragraph.

Figure 4:
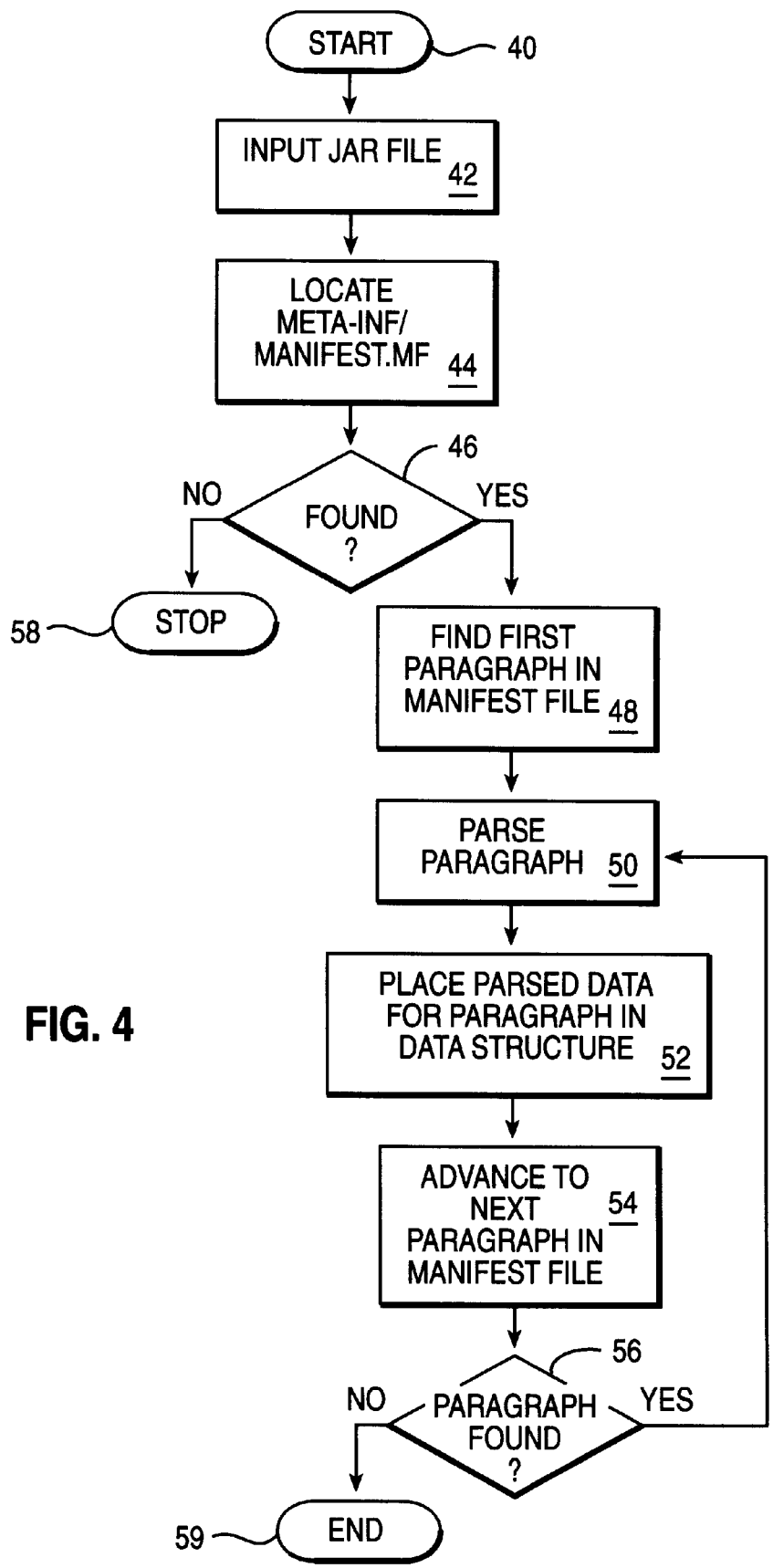
FIG. 4 is a flow diagram showing the procedure for storing the contents of a Java Archive file in the novel storage structure of this invention.

Referring to FIG. 4, a flow diagram is shown for placing data in the data structure of this invention. The procedure starts at block 40 and proceeds immediately to block 42 where the JAR file is inputted. The procedure locates the JAR file's META-INF/MANIFEST.MF file as shown in FIG. 44. A check is conducted at block 46 to determine if the Manifest file was located. If NO, processing stops at block 58. Else, at block 48 the procedure finds the first paragraph in the Manifest file. At block 50 the procedure parses the paragraph and places the parsed data for the paragraph in the data structure at block 52. At block 54 the procedure advances to the next paragraph in the Manifest file. A check is conducted at block 56 to determine if a paragraph was found. If NO, the procedure ends at block 59. Else, processing continues at block 50 to parse the next paragraph.

Figure 5:
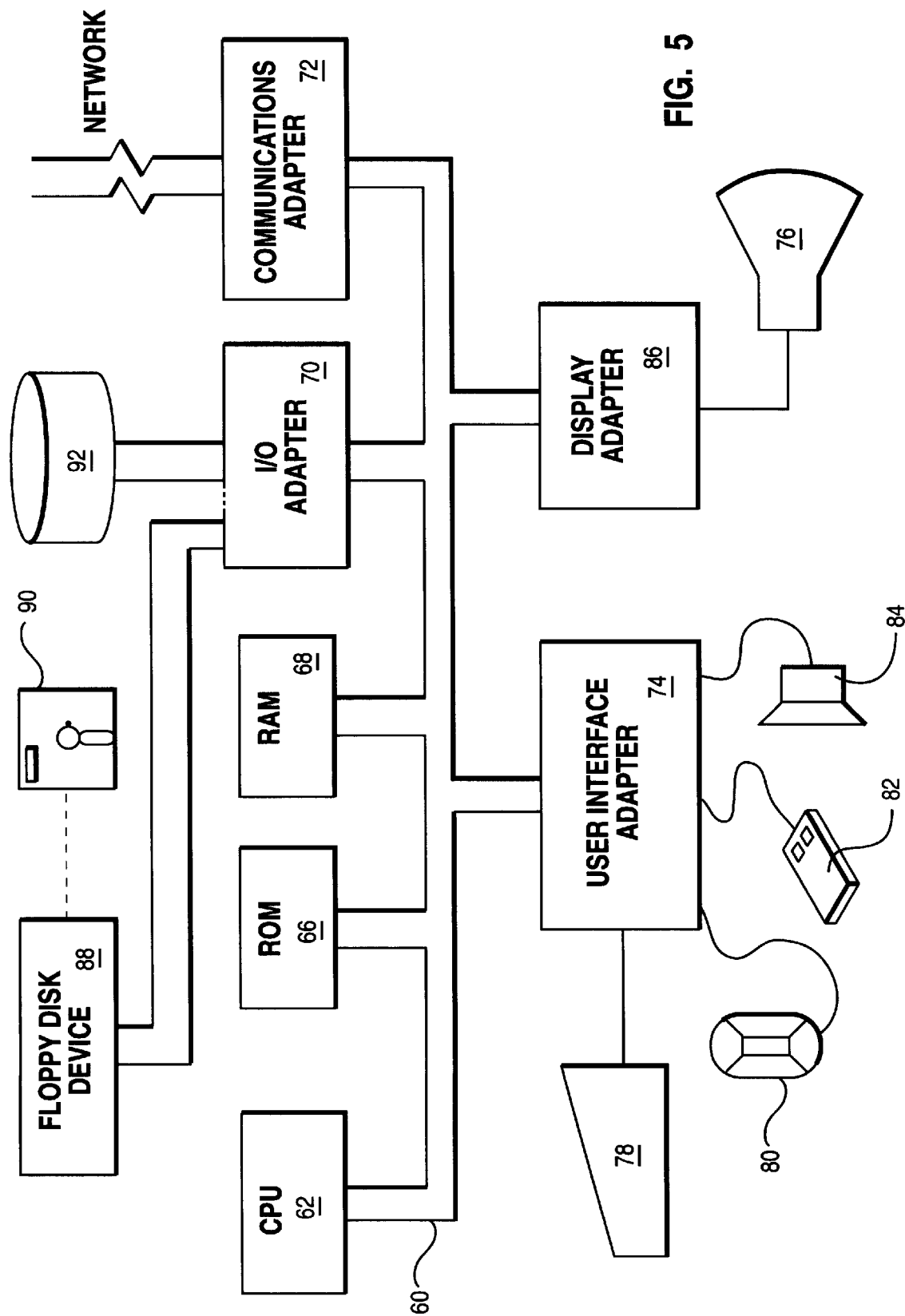
FIG. 5 illustrates a computer/workstation where this invention may be practiced.

Referring now to FIG. 5, there is shown a pictorial representation of a workstation, having a central processing unit 62, such as a conventional microprocessor, and a number of other units interconnected via a system bus 60. The workstation shown in FIG. 5, includes a Random Access Memory (RAM) 68, Read Only Memory (ROM) 66, an I/O Adapter 70 for connecting peripheral devices such as floppy disk unit 88 to the bus, a user interface adapter 74 for connecting a keyboard 78, a mouse 82, a speaker 84, a microphone 80, and/or other user interface devices such as a touch screen device (not shown) to the bus, a communication adapter 72, for connecting the workstation to a data processing network and a display adapter 86, for connecting the bus to a display device 76. The workstation, in the preferred embodiment, has resident thereon the computer software making up this invention, which may be loaded from diskette 90.

Figure 6:
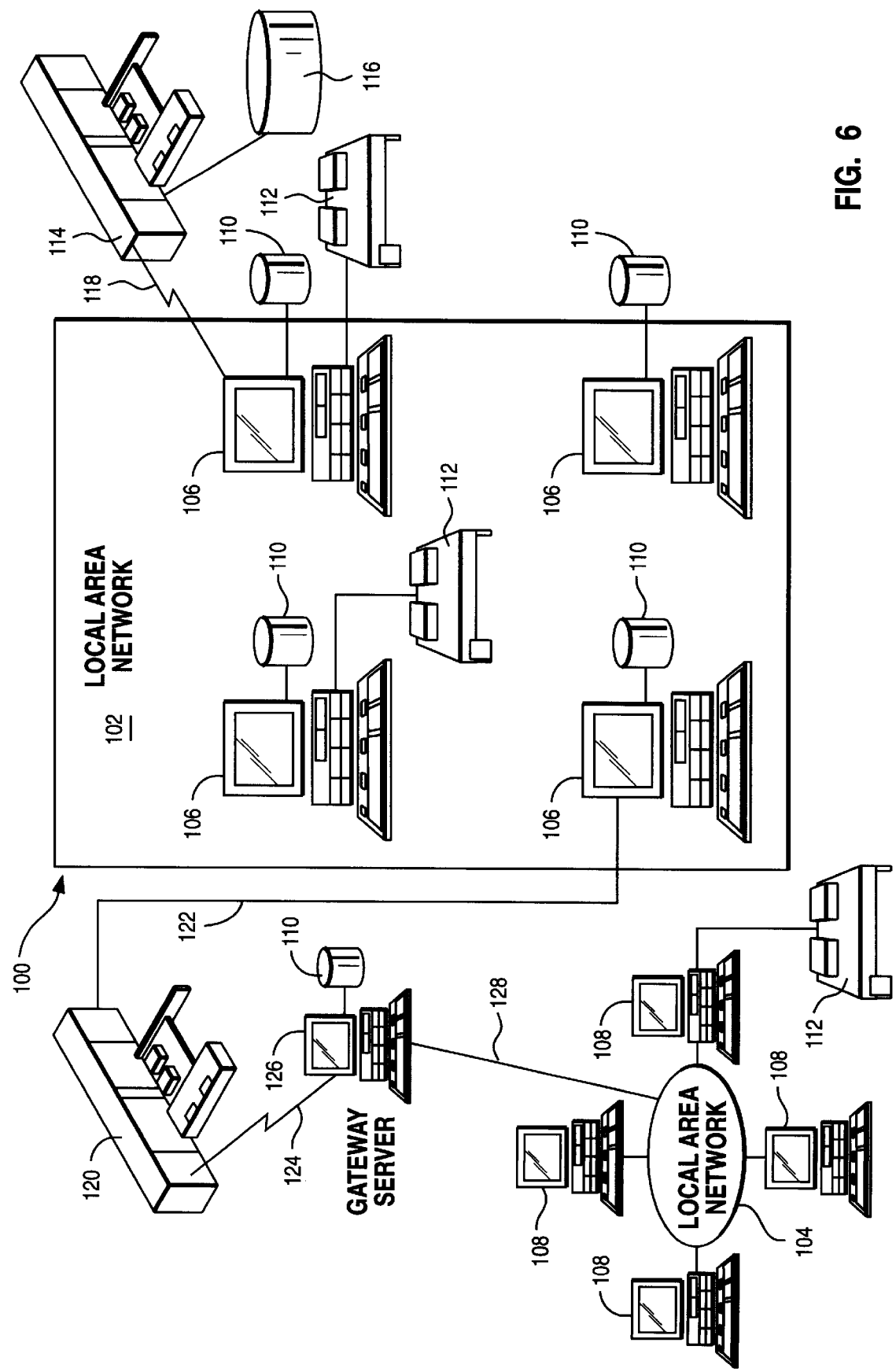
FIG. 6 is an illustrative embodiment of a computer network where the present invention may be practiced.

A representative network environment where this invention may be practiced is depicted in FIG. 6, which illustrates a pictorial representation of a distributed data processing system 100. As illustrated, data processing system 100 contains a plurality of networks, including local area networks (LAN) 102 and 104, each of which preferably includes a plurality of individual computers 106 and 108, respectively as shown in FIG. 5. One skilled in the art will appreciate that a plurality of workstations coupled to a host processor may be utilized for each such network. As is common in such data processing systems, each computer 106 and 108, may be coupled to a storage device 110, and a printer 112.

Data processing system 100 further includes one or more mainframe computers, such as mainframe computer 114, which may be preferably coupled to LAN 102 by means of a communication link 118. Mainframe computer 114 is preferably coupled to a storage device 116, which serves as remote storage for LAN 102. LAN 102 is also coupled via communications link 122 through communications controller 120 and communications link 124 to gateway server 126. Gateway server 126 is preferably a workstation which serves to link LAN 102 to LAN 104 via communications link 128. As understood by one skilled in the art, data processing system 100 additionally includes unillustrated gateways, routers, bridges, and various other network hardware utilized to interconnect the segments of data processing system 100.

The data structure of this invention represents a fast, compact and flexible technique for handling parsed data from a Manifest file which allows the data to be easily accessed and manipulated. The invention is easily extendible to cover other alternatives. In cases where it is necessary or desirable to access manifest paragraphs by the Name:key of a data pair contained within a paragraph, the Paragraph Vector can be replaced with a Paragraph Hashtable. Each Paragraph Hashtable element has a key (for example, the aforementioned Name: value) and a value, the value being a reference to the affiliated Hashtable that contains the data pairs for that paragraph.

While the invention has been described with respect to a preferred embodiment thereof, it will be understood by those skilled in the art that various changes in detail may be made therein without departing from the spirit, scope, and teaching of the invention. Accordingly, the herein disclosed invention is to be limited only as specified in the following claims.

What is claimed is:

1. A method, implemented in a computer system, for creating a storage structure for an object-oriented object, comprising the steps of:

creating said object in said computer system having a plurality of paragraphs separated by blank lines;

creating an element in a Paragraph Vector corresponding to a selected one of said plurality of paragraphs; and associating said element in said Paragraph Vector with a reference in a hashtable corresponding to a data value pair in said selected one of said plurality of paragraphs.

2. The method of claim 1 wherein said step of creating said object further comprises:

parsing said object in said computer system for each of said plurality of paragraphs to produce a data pair for each line in said plurality of paragraphs.

3. The method of claim 1 wherein said object is a Java Bean in a Java Archive file.

4. The method of claim 1 wherein said step of creating an element further comprises:

creating a different element in said Paragraph Vector for another one of said plurality of paragraphs and appending said different element to said Paragraph Vector.

5. The method of claim 1 wherein said data value pair is a key and value for a line in said selected one of said plurality of paragraphs.

6. An apparatus for creating a storage structure for an object-oriented object, comprising:

means for creating said object in said computer system having a plurality of paragraphs separated by blank lines;

means for creating an element in a Paragraph Vector corresponding to a selected one of said plurality of paragraphs; and means for associating said element in said Paragraph Vector with a reference in a hashtable corresponding to a data value pair in said selected one of said plurality of paragraphs.

7. The apparatus of claim 6 wherein said means for creating said object further comprises:

means for parsing said object in said computer system for each of said plurality of paragraphs to produce a data pair for each line in said plurality of paragraphs.

8. The apparatus of claim 6 wherein said object is a Java Bean in a Java Archive file.

9. The apparatus of claim 6 wherein said means for creating an element further comprises:

means for creating a different element in said Paragraph Vector for another one of said plurality of paragraphs and appending said different element to said Paragraph Vector.

10. The apparatus of claim 9 wherein said data value pair is a key and value for a line in said selected one of said plurality of paragraphs.

11. A computer program product having a computer readable medium having computer program logic recorded thereon for creating a storage structure for an object-oriented object, comprising:

computer readable means for creating said object in said computer system having a plurality of paragraphs separated by blank lines;

computer readable means for creating an element in a Paragraph Vector corresponding to a selected one of said plurality of paragraphs; and computer readable means for associating said element in said Paragraph Vector with a reference in a hashtable corresponding to a data value pair in said selected one of said plurality of paragraphs.

12. A computer program product of claim 11 wherein said computer readable means for creating said object further comprises:

computer readable means for parsing said object in said computer system for each of said plurality of paragraphs to produce a data pair for each line in said plurality of paragraphs.

13. A computer program product of claim 11 wherein said object is a Java Bean in a Java Archive file.

14. A computer program product of claim 11 wherein said computer readable means for creating an element further comprises:

computer readable means for creating a different element in said Paragraph Vector for another one of said plurality of paragraphs and appending said different element to said Paragraph Vector.

15. A computer program product of claim 11 wherein said data value pair is a key and value for a line in said selected one of said plurality of paragraphs.

* * * * *